US009563770B2

(12) United States Patent
Kim et al.

(10) Patent No.: US 9,563,770 B2
(45) Date of Patent: Feb. 7, 2017

(54) SPAMMER GROUP EXTRACTION APPARATUS AND METHOD

(71) Applicant: ELECTRONICS AND TELECOMMUNICATIONS RESEARCH INSTITUTE, Daejeon (KR)

(72) Inventors: Min Sik Kim, Daejeon (KR); Ki Heon Kim, Daejeon (KR); Min Kyung Cho, Daejeon (KR); In Sung Park, Daejeon (KR); Jong Cheoll Moon, Daejeon (KR); Sang Woo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/324,374

(22) Filed: Jul. 7, 2014

(65) Prior Publication Data

US 2015/0113651 A1    Apr. 23, 2015

(30) Foreign Application Priority Data

Oct. 21, 2013    (KR) .......................... 10-2013-0125417

(51) Int. Cl.
*H04L 29/06*    (2006.01)
*G06F 21/55*    (2013.01)
*H04L 12/58*    (2006.01)

(52) U.S. Cl.
CPC .............. *G06F 21/554* (2013.01); *H04L 51/32* (2013.01); *H04L 63/1425* (2013.01); *H04L 51/12* (2013.01)

(58) Field of Classification Search
CPC ........ G06F 21/554; H04L 51/32; H04L 51/12; H04L 63/1425

(Continued)

(56) References Cited

U.S. PATENT DOCUMENTS

2007/0226248 A1*  9/2007  Darr .............................. 707/102
2008/0281622 A1   11/2008 Hoal
(Continued)

FOREIGN PATENT DOCUMENTS

KR    10-2004-0072059 A    8/2004
KR    10-2012-0108095 A    10/2012
(Continued)

OTHER PUBLICATIONS

Fabricio Benevenuto et al., "Detecting Spammers on Twitter," CEAS, 2010, Seventh annual Collaboration, Electronic messaging, Anti-Abuse and Spam Conference, Jul. 13-14, 2010, Redmond, Washington, US.

*Primary Examiner* — Michael S McNally
(74) *Attorney, Agent, or Firm* — LRK Patent Law Firm

(57) ABSTRACT

The present invention relates to a spammer group extraction apparatus and method, which extract spammer groups that interfere with fair trade and unbiased decision making by sending messages aimed at intentionally slandering other companies (other persons, other products, etc.) on social network services. The spammer group extraction apparatus includes a data collection unit for collecting pieces of data corresponding to social network services. A natural language processing unit preprocesses the pieces of data using a natural language processing algorithm based on big data. An abnormal behavior detection unit detects abnormal behavior based on user identifications (IDs) respectively corresponding to pieces of data, preprocessing of which has been completed. A spammer extraction unit extracts a spammer group using a user ID causing the abnormal behavior and an ID of a user group including the user ID.

11 Claims, 2 Drawing Sheets

(58) Field of Classification Search
USPC .......................................................... 726/24
See application file for complete search history.

(56) References Cited

U.S. PATENT DOCUMENTS

| | | | |
|---|---|---|---|
| 2009/0300150 A1* | 12/2009 | Rudy et al. ................... | 709/222 |
| 2010/0325213 A1* | 12/2010 | Harris, III ..................... | 709/206 |
| 2011/0296524 A1* | 12/2011 | Hines et al. .................... | 726/22 |
| 2011/0307434 A1* | 12/2011 | Rostampour et al. .......... | 706/45 |
| 2012/0174225 A1* | 7/2012 | Shyamsunder et al. ........ | 726/24 |
| 2013/0151526 A1 | 6/2013 | Jeong et al. | |
| 2013/0262468 A1* | 10/2013 | Kikkawa et al. .............. | 707/740 |
| 2014/0317409 A1* | 10/2014 | Bartok et al. ................. | 713/171 |

FOREIGN PATENT DOCUMENTS

| | | |
|---|---|---|
| KR | 10-2013-0026099 A | 3/2013 |
| KR | 10-2013-0065322 A | 6/2013 |
| KR | 10-2013-0108855 A | 10/2013 |

\* cited by examiner

SPAMMER GROUP EXTRACTION APPARATUS AND METHOD

CROSS REFERENCE TO RELATED APPLICATION

This application claims the benefit of Korean Patent Application No. 10-2013-0125417, filed on Oct. 21, 2013, which is hereby incorporated by reference in its entirety into this application.

BACKGROUND OF THE INVENTION

1. Technical Field

The present invention relates generally to a spammer group extraction apparatus and method and, more particularly, to a spammer group extraction apparatus and method, which extract spammer groups that interfere with fair trade and unbiased decision making by sending messages aimed at intentionally slandering other companies (other persons, other products, etc.) on social network services.

2. Description of the Related Art

With the development and popularization of smart devices, the number of users who use online Social Network Services (SNS) has exponentially increased, and thus the importance of social network services has gradually increased as a new paradigm for sharing information.

As the number of users who use such a social network service increases, the number of various types of malicious activities, for example, the distribution of malicious code to cheat users out of money, the circulation of viruses, the theft of personal information, and the circulation of intentional false information, has rapidly increased.

Recently, in order to cope with malicious activities using a social network service, various detection, prevention, and blocking algorithms have been applied and operated, or research into such algorithms has been conducted.

However, most malicious behavior detection and blocking algorithms are implemented using a method of detecting whether each unit message is a spam message based on a relational distance and connectivity between a sender and a recipient, a method of detecting whether a message is a malicious spam message via the analysis of a simple message hashtag and a Uniform Resource Locator (URL), and a method of detecting spam in consideration of user identification (ID) and message-based simple characteristics, such as the ratio of the number of followers and the number of friends of a user ID, the ratio of the number of messages containing URLs to the total number of messages that are recently exchanged by the user ID, the ratio of messages containing hashtags, the ratio of messages having content similarity, and the ratio of messages containing spam-related keywords.

For example, Korean Patent Application Publication No. 10-2004-0072059 entitled "Automatic spam email blocking method using link URL access" discloses technology for extracting URL information linked to a received email, accessing the corresponding web page, filtering the email as a spam email if the email contains a predefined spam keyword, and then automatically blocking the spam. That is, Korean Patent Application Publication No. 10-2004-0072059 uses a malicious behavior detection and blocking algorithm that adopts a method of detecting whether the corresponding email is malicious spam, based on the analysis of URLs.

However, in this way, the malicious behavior detection and blocking algorithms are concentrated on the circulation of advertising spam or malicious code, and thus there are limitations in detecting the behavior of circulating false information and the intentional and collective malicious behavior of ID groups.

SUMMARY OF THE INVENTION

Accordingly, the present invention has been made keeping in mind the above problems occurring in the prior art, and an object of the present invention is to provide a spammer group extraction apparatus and method, which extract spammer groups that interfere with fair trade and unbiased decision making by sending messages aimed at intentionally slandering other companies (other persons, other products, etc.), using a malicious spammer group detection solution on social network services.

In accordance with an aspect of the present invention to accomplish the above object, there is provided a spammer group extraction method, including collecting pieces of data corresponding to social network services; preprocessing the pieces of data using a natural language processing algorithm based on big data; detecting abnormal behavior based on user identifications (IDs) respectively corresponding to pieces of data, preprocessing of which has been completed; and extracting a spammer group using a user ID causing the abnormal behavior and an ID of a user group including the user ID.

Detecting the abnormal behavior may be configured to detect, for each of the user IDs respectively corresponding to the pieces of data, preprocessing of which has been completed, abnormal behavior corresponding to at least one of whether an identical phrase has been distributed, whether an identical keyword and an associated keyword have been distributed, whether Retweet (RT)-centered activities have been conducted, and whether activities have been conducted in a specific time span, via analysis of big data.

Preprocessing the pieces of data may be configured to perform, on the pieces of data, a preprocessing procedure corresponding to one of a procedure for extracting keywords from the data, a procedure for sorting the data using extracted keywords, a procedure for extracting keywords associated with the respective pieces of data, and a procedure for identifying characteristics of messages corresponding to the data.

Extracting the spammer group may include extracting a spammer ID based on results of analysis of characteristics of individual IDs and connection characteristics between the IDs using the user ID causing the abnormal behavior and the ID of the user group including the user ID; and finally extracting the spammer group corresponding to the spammer ID.

Collecting the pieces of data may be configured to store data corresponding to the social network service in a Not only Structured Query Language (NoSQL) database (DB) or a Hadoop platform.

In accordance with another aspect of the present invention to accomplish the above object, there is provided a spammer group extraction apparatus, including a data collection unit for collecting pieces of data corresponding to social network services; a natural language processing unit for preprocessing the pieces of data using a natural language processing algorithm based on big data; an abnormal behavior detection unit for detecting abnormal behavior based on user identifications (IDs) respectively corresponding to pieces of data, preprocessing of which has been completed; and a spammer extraction unit for extracting a spammer group using a user ID causing the abnormal behavior and an ID of a user group including the user ID.

The abnormal behavior detection unit may be configured to detect, for each of the user IDs respectively corresponding to the pieces of data, preprocessing of which has been completed, abnormal behavior corresponding to at least one of whether an identical phrase has been distributed, whether an identical keyword and an associated keyword have been distributed, whether Retweet (RT)-centered activities have been conducted, and whether activities have been conducted in a specific time span, via analysis of big data.

The natural language processing unit may be configured to perform, on the pieces of data, a preprocessing procedure corresponding to one of a procedure for extracting keywords from the data, a procedure for sorting the data using extracted keywords, a procedure for extracting keywords associated with the respective pieces of data, and a procedure for identifying characteristics of messages corresponding to the data.

The spammer extraction unit may be configured to extract a spammer ID based on results of analysis of characteristics of individual IDs and connection characteristics between the IDs using the user ID causing the abnormal behavior and the ID of the user group including the user ID, and to finally extract the spammer group corresponding to the spammer ID.

The data collection unit may store data corresponding to the social network service in a Not only Structured Query Language (NoSQL) database (DB) or a Hadoop platform.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
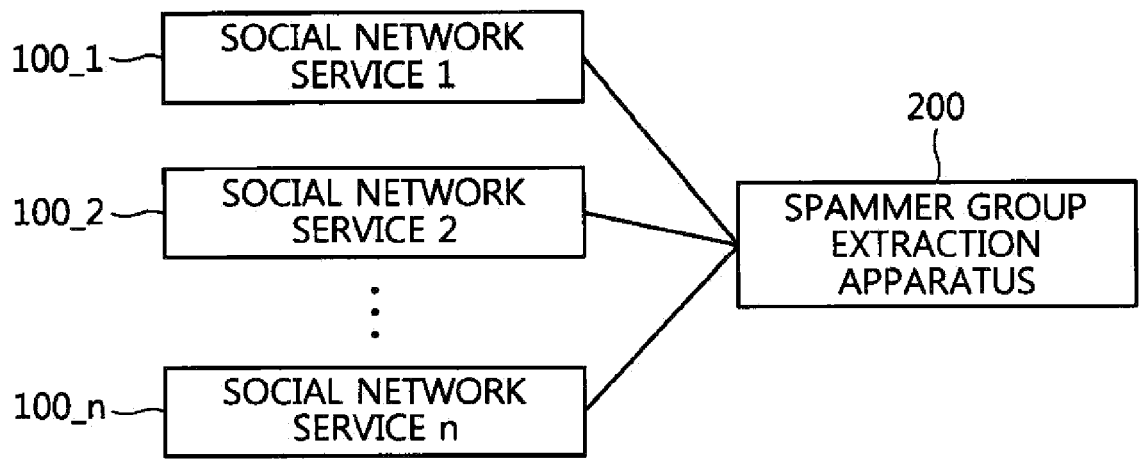
FIG. 1 is a diagram showing an environment to which a spammer group extraction apparatus according to an embodiment of the present invention is applied.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

Hereinafter, a spammer group extraction apparatus and method according to embodiments of the present invention will be described in detail with reference to the attached drawings.

FIG. 1 is a diagram showing an environment to which a spammer group extraction apparatus according to an embodiment of the present invention is applied. Further, FIG. 2 is a configuration diagram schematically showing a spammer group extraction apparatus according to an embodiment of the present invention.

Referring to FIG. 1, a spammer group extraction apparatus 200 according to an embodiment of the present invention extracts spammer groups, which interfere with fair trade and unbiased decision making by sending messages aimed at intentionally slandering other companies (other persons, other products, etc.), using an algorithm for processing messages based on a natural language and detecting and extracting abnormal behavior on a plurality of social network services 100_1 to 100_n, so that post legal action evidence is provided, or advance prevention is induced, thus enabling fair trade and unbiased decision making.

Figure 2:
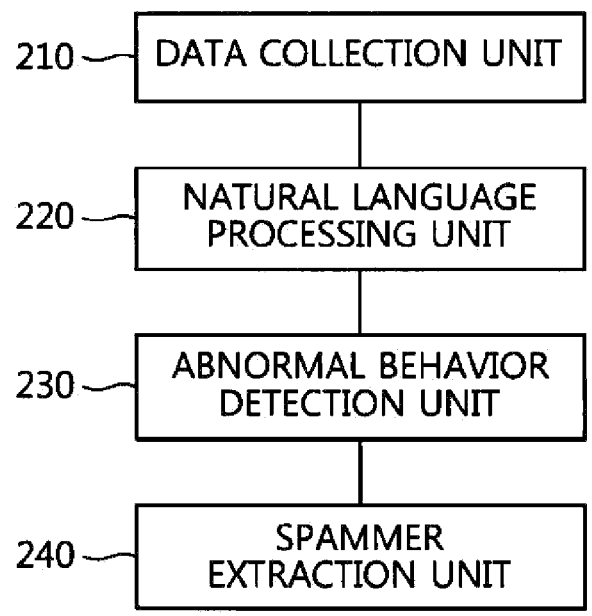
FIG. 2 is a configuration diagram schematically showing a spammer group extraction apparatus according to an embodiment of the present invention.

Referring to FIG. 2, the spammer group extraction apparatus 200 includes a data collection unit 210, a natural language processing unit 220, an abnormal behavior detection unit 230, and a spammer extraction unit 240.

The data collection unit 210 collects pieces of Social Network Service (SNS) data corresponding to SNSs 100_1 to 100_n.

The data collection unit 210 collects at least two pieces of SNS data, portal service information, etc. so as to improve precision in the extraction of a spammer group upon collecting SNS data. Further, the SNS data collected by the data collection unit 210 is stored in a specific storage device, for example, a Not only Structured Query Language (NoSQL) database (DB) or a Hadoop platform, so that big data can be analyzed.

The natural language processing unit 220 preprocesses the pieces of data, that is, SNS data, collected by the data collection unit 210 using a natural language processing algorithm based on big data.

In detail, the natural language processing unit 220 performs a preprocessing procedure, such as a procedure for extracting keywords from the SNS data, a procedure for sorting the SNS data using the extracted keywords, a procedure for extracting keywords associated with respective pieces of SNS data, or a procedure for identifying the characteristics of messages (for example, Acknowledgement (ACK) or Negative ACK (HACK)) corresponding to the SNS data.

The abnormal behavior detection unit 230 detects abnormal behavior based on user IDs, from the SNS data, the preprocessing of which has been completed.

In detail, the abnormal behavior detection unit 230 detects, for a single ID, abnormal behavior corresponding to whether the same phrase has been distributed, whether the same keyword and an associated keyword have been distributed, whether Retweet (RT)-centered activities are conducted, whether activities are made in a specific time span, whether a pattern is present in the naming of each individual ID, or between IDs, or whether similarity is present in time of creation of IDs and in the duration of IDs, via the analysis of the big data.

The spammer extraction unit 240 extracts a spammer ID based on the results of detection of abnormal behavior, that is, results obtained by analyzing the characteristics of the individual IDs and connection characteristics between IDs using user IDs causing abnormal behavior and the IDs of user groups including the user IDs, and finally extracts a spammer group corresponding to the spammer ID.

In detail, the spammer extraction unit 240 visualizes the results of the analysis of the characteristics of individual IDs and connection characteristics between IDs. Further, the spammer extraction unit 240 also visualizes information such as the abnormal behavior characteristics of respective user IDs causing abnormal behavior, the number of messages that are created, and connection networks between user IDs causing abnormal behavior.

Further, the spammer extraction unit 240 sets the finally extracted spammer ID and a spammer group corresponding to the spammer ID, to a blacklist, and always monitors the blacklist so as to cope with spam activities in real time.

In this way, the present invention extracts a spammer group, which interferes with fair trade and unbiased decision making by sending messages aimed at intentionally slandering other companies (other persons, other products, etc.), by means of a preprocessing procedure that exploits a natural language processing algorithm based on big data and a procedure for detecting abnormal behavior based on user IDs on social network services, so that post legal action evidence can be provided, or advance prevention can be induced, thus enabling fair trade and unbiased decision making.

Next, a spammer group extraction method will be described in detail with reference to FIG. 3.

Figure 3:
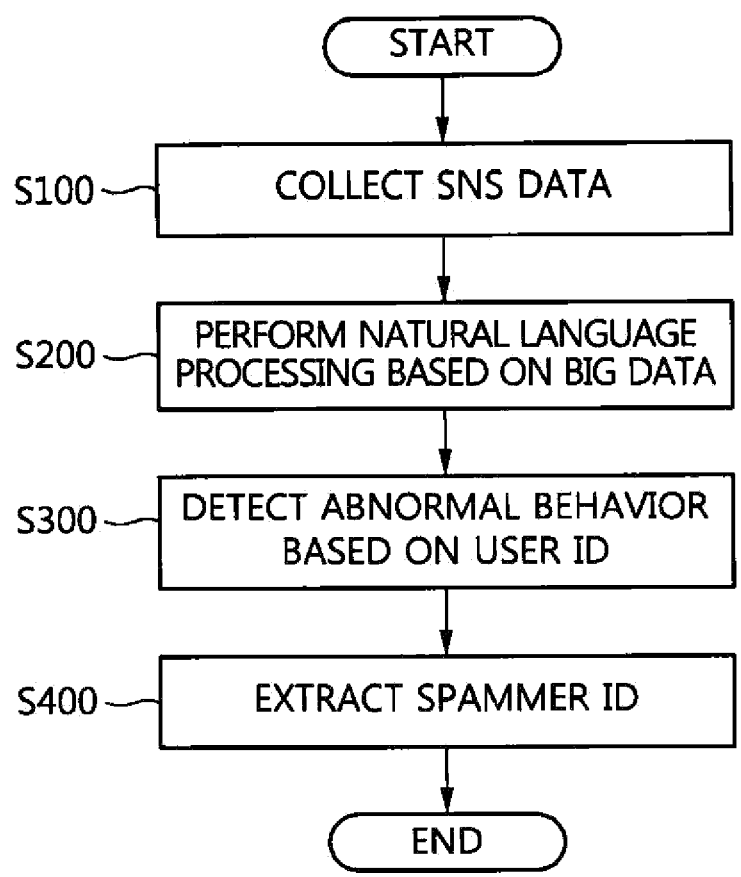
FIG. 3 is a flowchart showing a spammer group extraction method according to an embodiment of the present invention.

FIG. 3 is a flowchart showing a spammer group extraction method according to an embodiment of the present invention.

First, the spammer group extraction apparatus 200 according to an embodiment of the present invention extracts a spammer group, which interferes with fair trade and unbiased decision making by sending messages aimed at intentionally slandering others on a plurality of social network services 100_1 to 100_n.

Referring to FIG. 3, the spammer group extraction apparatus 200 collects pieces of SNS data corresponding to the social network services 100_1 to 100_n at step S100.

In this case, the spammer group extraction apparatus 200 collects at least two pieces of SNS data, portal service information, etc. so as to improve the precision of extraction of a spammer group upon collecting the SNS data. Further, the collected SNS data is stored in a specific storage device, for example, a NoSQL DB or a Hadoop platform, so that big data can be analyzed.

The spammer group extraction apparatus 200 preprocesses the data collected at step S100, that is, the SNS data, using a natural language processing algorithm based on big data at step S200.

At step S200, the spammer group extraction apparatus 200 performs a preprocessing procedure, such as a procedure for extracting keywords from the SNS data, a procedure for sorting the SNS data using the extracted keywords, a procedure for extracting keywords associated with the respective pieces of SNS data, or a procedure for identifying the characteristics of messages (for example, ACK or Negative ACK: NACK) corresponding to the SNS data.

The spammer group extraction apparatus 200 detects abnormal behavior based on each user ID from the SNS data, the preprocessing of which has been completed at step S200, at step S300.

In detail, the spammer group extraction apparatus 200 detects, for a single ID, abnormal behavior corresponding to whether the same phrase has been distributed, whether the same keyword and an associated keyword have been distributed, whether Retweet (RT)-centered activities have been conducted, whether activities have been conducted in a specific time span, whether a pattern is present in the naming of each individual ID or between IDs, or whether similarity is present in the time of creation of IDs and in the duration of IDs, via the analysis of the big data.

The spammer group extraction apparatus 200 extracts a spammer ID based on the results of detection of abnormal behavior at step S300, that is, the results of the analysis of the characteristics of individual IDs and connection characteristics between the IDs using each user ID causing abnormal behavior and the ID of a user group including the user ID, and filially extracts a spammer group corresponding to the spammer ID at step S400.

Further, the spammer group extraction apparatus 200 visualizes the results of the analysis of the characteristics of individual IDs and connection characteristics between the IDs. Further, the spammer group extraction apparatus 200 also visualizes information such as the abnormal behavior characteristics of respective user IDs causing abnormal behavior, the number of messages that are created, and connection networks between the user IDs causing abnormal behavior.

In this way, the spammer group extraction method according to the embodiment of the present invention can extract a spammer group, which interferes with fair trade and unbiased decision making by sending messages aimed at intentionally slandering other companies (other persons, other products, etc.), by means of a preprocessing procedure that exploits a natural language processing algorithm based on big data and a procedure for detecting abnormal behavior based on user IDs on social network services.

In accordance with the present invention, the spammer group extraction apparatus and method extract a spammer group, which interferes with fair trade and unbiased decision making by sending messages aimed at intentionally slandering other companies (other persons, other products, etc.), by means of a preprocessing procedure that exploits a natural language processing algorithm based on big data and a procedure for detecting abnormal behavior based on user IDs on social network services, so that post legal action evidence can be provided, or advance prevention can be induced, thus enabling fair trade and unbiased decision making.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A spammer group extraction method, comprising:
   collecting pieces of data corresponding to social network services;
   preprocessing the pieces of data;
   detecting abnormal behavior based on user identifications (IDs) respectively corresponding to pieces of data, preprocessing of which has been completed;
   analyzing characteristics of individual IDs and connection characteristics between IDs using user IDs and IDs of a user group including the user IDs; and
   extracting and displaying, based on the analysis, a spammer group using the user IDs causing the abnormal behavior and the IDs of a user group including the user IDs,
   wherein preprocessing the pieces of data comprises performing one or more procedures of a set of procedures consisting of: a procedure for extracting keywords from the pieces of data, a procedure for sorting the pieces of data using extracted keywords, a procedure for extracting keywords associated with respective pieces of data of the pieces of data, and a procedure for identifying characteristics of messages corresponding to the pieces of data.

2. The spammer group extraction method of claim 1, wherein detecting the abnormal behavior is configured to detect, for each of the user IDs respectively corresponding to the pieces of data, preprocessing of which has been completed, abnormal behavior corresponding to at least one of whether an identical phrase has been distributed, whether an identical keyword and an associated keyword have been distributed, whether Retweet (RT)-centered activities have been conducted, and whether activities have been conducted in a specific time span, via analysis of data.

3. The spammer group extraction method of claim 1, wherein extracting the spammer group comprises:
   extracting a spammer ID based on results of analysis of characteristics of individual IDs and connection characteristics between the IDs using the user ID causing the abnormal behavior and the ID of the user group including the user ID; and
   extracting the spammer group corresponding to the spammer ID.

4. The spammer group extraction method of claim 1, wherein collecting the pieces of data comprises storing data corresponding to the social network service in a Not only Structured Query Language (NoSQL) database (DB) or a Hadoop platform.

5. The spammer group extraction method of claim 1, wherein the displaying comprises visualizing results of the analysis of the characteristics of individual IDs and connection characteristics between IDs, visualizing information such as the abnormal behavior characteristics of respective user IDs causing abnormal behavior, visualizing the number of messages that are created, and visualizing connection networks between user IDs causing abnormal behavior.

6. The spammer group extraction method of claim 1, wherein preprocessing the pieces of data comprises: performing a procedure for extracting keywords from the pieces of data, a procedure for sorting the pieces of data using extracted keywords, a procedure for extracting keywords associated with respective pieces of data of the pieces of data, and a procedure for identifying characteristics of messages corresponding to the pieces of data.

7. A spammer group extraction apparatus, comprising:
   a processor;
   a spammer group extraction device comprising:
   one or more units comprising instructions stored on the spammer group extraction apparatus that when executed by the processor cause the processor to perform the one or more units, the units comprising,
   a data collection unit for collecting pieces of data corresponding to social network services;
   a natural language processing unit for preprocessing the pieces of data;
   an abnormal behavior detection unit for detecting abnormal behavior based on user identifications (IDs) respectively corresponding to pieces of data, preprocessing of which has been completed
   in response to detection of the abnormal behavior corresponding to respective user IDs,
   the abnormal behavior detection unit for analyzing characteristics of respective user IDs and connection characteristics between IDs using user IDs and IDs of a user group including the user IDs; and
   in response to receipt of the analysis corresponding to the user IDs,
   a spammer extraction unit for extracting and displaying a spammer group using the user IDs causing the abnormal behavior and the IDs of a user group including the user IDs,
   wherein the natural language processing unit is configured to perform, on the pieces of data, preprocessing of the pieces of data by performing one or more procedures of a set of procedures consisting of: a procedure for extracting keywords from the pieces of data, a procedure for sorting the pieces of data using extracted keywords, a procedure for extracting keywords associated with respective pieces of data of the pieces of data, and a procedure for identifying characteristics of messages corresponding to the pieces of data.

8. The spammer group extraction apparatus of claim 7, wherein the abnormal behavior detection unit is configured to detect, for each of the user IDs respectively corresponding to the pieces of data, preprocessing of which has been completed, abnormal behavior corresponding to at least one of whether an identical phrase has been distributed, whether an identical keyword and an associated keyword have been distributed, whether Retweet (RT)-centered activities have been conducted, and whether activities have been conducted in a specific time span, via analysis of data.

9. The spammer group extraction apparatus of claim 7, wherein the spammer extraction unit is configured to extract a spammer ID based on results of analysis of characteristics of individual IDs and connection characteristics between the IDs using the user ID causing the abnormal behavior and the ID of the user group including the user ID, and to finally extract the spammer group corresponding to the spammer ID.

10. The spammer group extraction apparatus of claim 7, wherein the data collection unit is configured to store data corresponding to the social network service in a Not only Structured Query Language (NoSQL) database (DB) or a Hadoop platform.

11. The spammer group extraction apparatus of claim 7, wherein the natural language processing unit is configured to perform, on the pieces of data, preprocessing of the pieces of data by performing a set of procedures comprising: performing a procedure for extracting keywords from the pieces of data, a procedure for sorting the pieces of data using extracted keywords, a procedure for extracting keywords associated with respective pieces of data of the pieces of data, and a procedure for identifying characteristics of messages corresponding to the pieces of data.

* * * * *